Patented June 21, 1927.

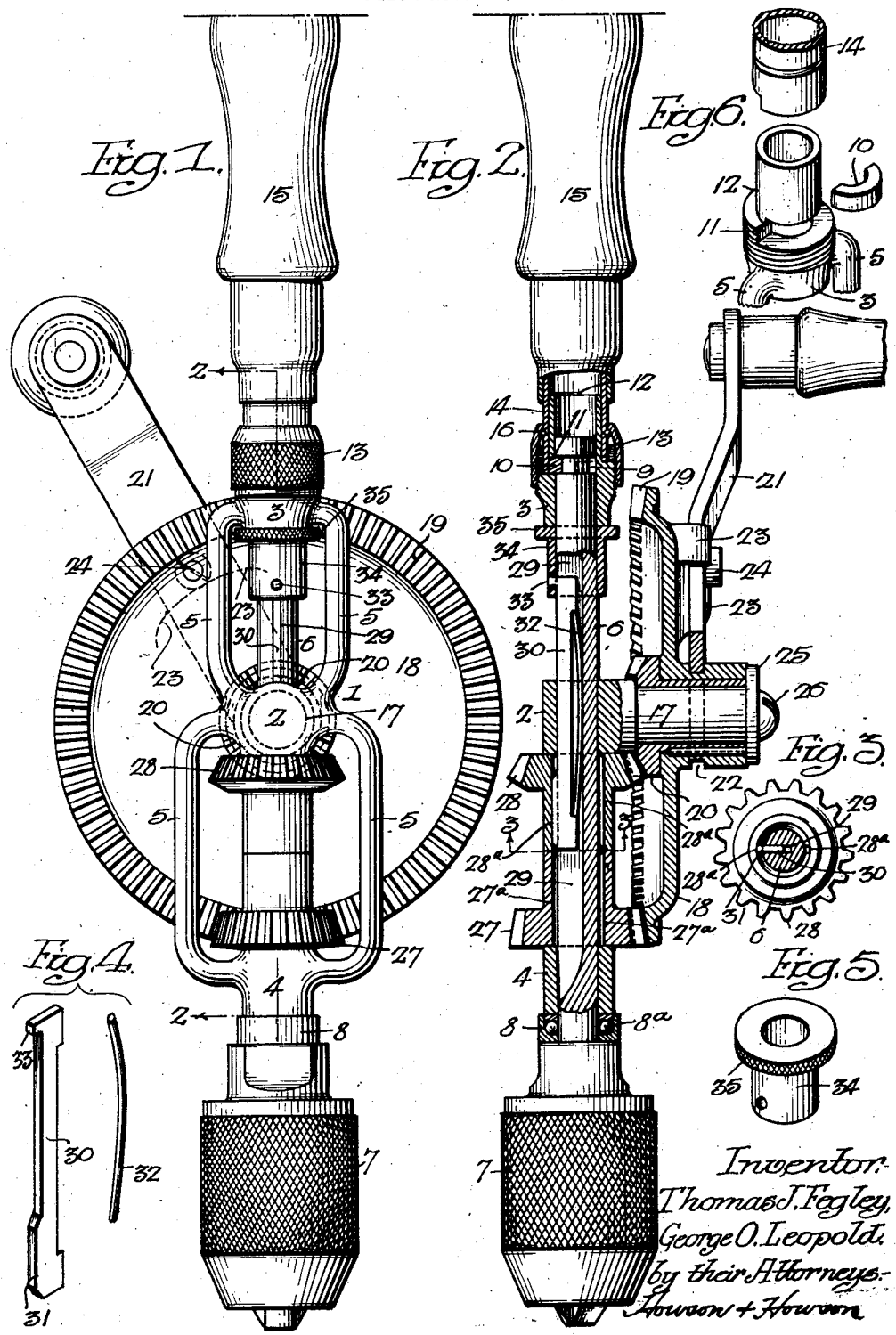

1,633,400

UNITED STATES PATENT OFFICE.

THOMAS J. FEGLEY AND GEORGE O. LEOPOLD, OF PHILADELPHIA, PENNSYLVANIA, ASSIGNORS TO NORTH BRO'S M'F'G. CO., OF PHILADELPHIA, PENNSYLVANIA, A CORPORATION OF PENNSYLVANIA.

BREAST DRILL.

Application filed November 25, 1925. Serial No. 71,446.

The object of our invention is to so construct a breast drill of the change gear type that it will be compact and simple in construction, the chuck being located close to the frame of the drill.

In the accompanying drawing:

Fig. 1 is a view in elevation illustrating a breast drill without improved means for changing the speed of the spindle;

Fig. 2 is a vertical sectional view on the line 2—2, Fig. 1;

Fig. 3 is a sectional view on the line 3—3, Fig. 2;

Fig. 4 is a detached perspective view of the sliding shifter and spring;

Fig. 5 is a detached perspective view of the shifter sleeve; and

Fig. 6 is a detached perspective view of the coupling between the frame and its handle.

The frame 1 of the drill has a central bearing 2, an upper bearing 3, and a lower bearing 4, the bearings being connected by bars 5 formed integral with the bearings. The frame in the present instance is a casting.

Extending through the several bearings of the frame is a spindle 6 having a chuck 7 of any suitable type at its outer end. The chuck 7 is located close to the lower bearing 4 of the frame, and between the chuck and the bearing is a loose flanged anti-friction ring 8. Between this ring and the bearing are a series of balls 8ª. Near the inner end of the spindle 6 is an annular groove 9, shaped to receive a segmental key 10, fitting a slot 11 in an extension 12 of the frame. The key is held in place by a screw-threaded sleeve 13, which is confined to the ferrule 14 of the handle 15 by a split ring 16 located in an annular groove in the ferrule. The ferrule 14 is cut away to form a recess for a segmental portion of the extension 12 of the frame, so that when the parts are assembled, the handle is held from turning on the frame.

On a stud 17, projecting at a right angle from the central bearing 2, is a bevel gear-wheel 18, which has a series of teeth 19 at its periphery. Attached to the gear-wheel 18 is a handle 21. The handle is adapted to a groove 22 in the hub of the wheel and is located between two lugs 23, being held in position by a screw 24.

The gear-wheel is confined to the spindle by a washer 25 and a screw 26. Secured to the gear-wheel 18 is a second gear-wheel 20, less in diameter than the wheel 18. The hub of the gear-wheel 20 extends into the hub of the gear-wheel 18 and is keyed thereto.

On the spindle 6 between the bearings 2 and 4 are two bevel gear-wheels 27 and 28. The gear-wheel 27 meshes with the teeth of the bevel gear-wheel 18, and the gear-wheel 28 meshes with the small bevel gear-wheel 20.

The spindle has a longitudinal groove 29 therein, as shown in Fig. 2, and each bevel gear-wheel 27 and 28 has a pair of keyways 27ª—27ª and 28ª—28ª, one of either pair of which can be brought into alignment with the groove in the spindle.

In the groove 29 is an elongated shifting key 30, having a projection 31 arranged to enter a keyway in either one of the two gear-wheels 27 or 28. The shifting key 30 is notched at the back to receive a spring 32, which tends to force the key into one or the other of the keyways in the gear-wheels.

Projecting from the inner end of the shifting key 30 is a lug 33 which extends into an opening in a shifting sleeve 34 arranged to slide on the spindle. This sleeve has a flange 35 by which it can be readily shifted. This shifting sleeve 34 is located in the space between the bearings 3 and 4 and is protected by the bearings and the side bars.

When the shifter sleeve and its key are in the position shown in Fig. 2, the gear-wheel 28 is keyed to the spindle, and the spindle is driven at slow speed from the gear-wheel 20, the gear-wheel 27 running loose on the spindle.

When the shifter is moved towards the bearing 2, the key engages the gear-wheel 27, freeing the gear-wheel 28, and the spindle 6 is driven at high speed through the gear-teeth 19 on the gear-wheel 18 and the bevel gear-wheel 27.

By locating the shifter sleeve within the frame as shown, the drill is made more compact than heretofore, and the chuck has a direct bearing on the frame through the ball-bearing ring.

We claim:

1. The combination in a breast drill, of a frame having bearings for the drilling mechanism; a spindle mounted in said bearings, said spindle having an annular groove at the inner end; a segmental recess in the frame; a handle having a ferrule cut away to fit the segmental recess; a segmental key located in the frame and extending into the annular groove in the spindle; a threaded sleeve adapted to an external thread on the frame; and a split-ring located in the groove in the ferrule of the handle, the sleeve fitting over the ring and acting to retain the handle to the frame and lock the key, through the medium of the ferrule, to the spindle.

2. The combination in a drill, of a frame having bearings for the drilling mechanism; a spindle mounted in the bearings and having an annular groove at one end, said frame having a threaded portion at one end, said threaded portion having a segmental recess, said frame also having a tubular extension beyond the threaded portion, the threaded portion being slotted; a segmental key located in the slot; a handle having a ferrule cut away to form a segmental recess to fit the segmental portion of the frame; and means for retaining the handle to the frame, the handle retaining the key in the groove of the spindle.

THOMAS J. FEGLEY.
GEORGE O. LEOPOLD.